(12) United States Patent
Albers et al.

(10) Patent No.: US 8,998,573 B2
(45) Date of Patent: Apr. 7, 2015

(54) RESILIENT MOUNTING APPARATUS FOR LOW-DUCTILITY TURBINE SHROUD

(75) Inventors: Joseph Albers, Fort Wright, KY (US);
Mark Marusko, Springboro, OH (US);
Barry Wilson, Broken Arrow, OK (US);
Aaron Dziech, Cincinnati, OH (US);
Christopher Johnson, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 893 days.

(21) Appl. No.: 12/915,424

(22) Filed: Oct. 29, 2010

(65) Prior Publication Data
US 2012/0107122 A1 May 3, 2012

(51) Int. Cl.
F01D 9/04 (2006.01)
F01D 25/24 (2006.01)
F01D 25/28 (2006.01)
F01D 11/00 (2006.01)

(52) U.S. Cl.
CPC .............. *F01D 25/246* (2013.01); *F01D 25/28* (2013.01); *F01D 9/04* (2013.01); *F01D 11/005* (2013.01); *Y02T 50/672* (2013.01)

(58) Field of Classification Search
USPC ........ 415/135–139, 173.1, 173.3, 174.2, 189, 415/190, 209.2–209.4, 210.1, 214.1
See application file for complete search history.

(56) References Cited

U.S. PATENT DOCUMENTS

| | | | |
|---|---|---|---|
| 4,472,108 A * | 9/1984 | Pask | 415/113 |
| 4,752,184 A * | 6/1988 | Liang | 415/116 |
| 5,074,748 A | 12/1991 | Hagle | |
| 5,154,577 A | 10/1992 | Kellock et al. | |
| 5,188,506 A * | 2/1993 | Creevy et al. | 415/115 |
| 5,188,507 A | 2/1993 | Sweeney | |
| 5,197,853 A * | 3/1993 | Creevy et al. | 415/115 |
| 5,423,659 A * | 6/1995 | Thompson | 415/173.1 |
| 5,655,876 A | 8/1997 | Rock et al. | |
| 5,738,490 A * | 4/1998 | Pizzi | 415/139 |
| 5,988,975 A * | 11/1999 | Pizzi | 415/139 |
| 5,993,150 A * | 11/1999 | Liotta et al. | 415/115 |

(Continued)

FOREIGN PATENT DOCUMENTS

| | | | | |
|---|---|---|---|---|
| EP | 2357322 A2 | 8/2011 | | |
| FR | 2646221 A1 * | 10/1990 | | F02C 7/28 |

(Continued)

OTHER PUBLICATIONS

Albers, et al.; U.S. Appl. No. 12/821,599, filed Jun. 23, 2010.

(Continued)

*Primary Examiner* — Edward Look
*Assistant Examiner* — Christopher R Legendre
(74) *Attorney, Agent, or Firm* — General Electric Company; William Scott Andes

(57) ABSTRACT

A turbine flowpath apparatus for a gas turbine engine includes: a flowpath component exposed at least partially to a primary combustion gas flowpath of the engine, the flowpath component comprising low-ductility material; a metallic annular stationary structure surrounding the flowpath component, including a bearing surface which bears against the flowpath component, so as to restrain the flowpath component from axial movement in a first direction; and a spring element disposed between the flowpath component and the stationary structure which resilient urges the flowpath component in the first direction against the bearing surface.

7 Claims, 6 Drawing Sheets

(56) References Cited

U.S. PATENT DOCUMENTS

| | | | |
|---|---|---|---|
| 6,290,459 | B1 | 9/2001 | Correia |
| 6,340,285 | B1 | 1/2002 | Gonyou et al. |
| 6,352,267 | B1 * | 3/2002 | Rode ............................ 277/631 |
| 6,413,042 | B2 | 7/2002 | Correia |
| 6,503,051 | B2 | 1/2003 | Predmore |
| 6,679,680 | B2 * | 1/2004 | Um et al. .................... 415/173.1 |
| 6,719,296 | B2 * | 4/2004 | Brauer et al. ................. 277/413 |
| 6,758,653 | B2 * | 7/2004 | Morrison .................... 415/173.4 |
| 6,814,538 | B2 * | 11/2004 | Thompson .................... 415/116 |
| 6,916,154 | B2 * | 7/2005 | Synnott ...................... 415/208.2 |
| 6,984,106 | B2 * | 1/2006 | Thompson ................ 415/173.1 |
| 7,571,614 | B2 * | 8/2009 | Lejars et al. ..................... 60/796 |
| 7,866,943 | B2 * | 1/2011 | Durand et al. ............. 415/173.1 |
| 8,079,807 | B2 * | 12/2011 | Shapiro et al. ............. 415/173.1 |
| 8,568,091 | B2 * | 10/2013 | McCaffrey ................ 415/173.3 |
| 2005/0232759 | A1 | 10/2005 | Bailleul et al. |
| 2007/0025837 | A1 | 2/2007 | Pezzetti, Jr. et al. |
| 2007/0237624 | A1 * | 10/2007 | Nigmatulin ................... 415/115 |
| 2008/0073861 | A1 | 3/2008 | Iguchi et al. |
| 2008/0206046 | A1 | 8/2008 | Razzell et al. |
| 2009/0208322 | A1 * | 8/2009 | McCaffrey .................... 415/113 |
| 2011/0293410 | A1 * | 12/2011 | Marusko et al. ........... 415/173.1 |
| 2011/0318171 | A1 * | 12/2011 | Albers et al. ............... 415/173.1 |
| 2012/0082540 | A1 * | 4/2012 | Dziech et al. .............. 415/173.1 |
| 2012/0107122 | A1 * | 5/2012 | Albers et al. .................. 416/179 |
| 2012/0171023 | A1 * | 7/2012 | Albers et al. ............... 415/173.1 |
| 2012/0171027 | A1 * | 7/2012 | Albers et al. ............... 415/208.1 |
| 2012/0189426 | A1 * | 7/2012 | Thibodeau et al. ............... 415/1 |
| 2013/0004306 | A1 * | 1/2013 | Albers et al. .................. 415/200 |
| 2013/0113168 | A1 * | 5/2013 | Lutjen et al. .................. 277/644 |
| 2013/0156550 | A1 * | 6/2013 | Franks et al. .................. 415/126 |
| 2013/0156556 | A1 * | 6/2013 | Franks et al. ............... 415/182.1 |

FOREIGN PATENT DOCUMENTS

| | | | |
|---|---|---|---|
| GB | 1434492 A | 5/1976 | |
| GB | 2034415 A | 6/1980 | |
| GB | 2239678 A | 7/1991 | |
| JP | 11343809 A | * 12/1999 | ............. F01D 11/08 |

OTHER PUBLICATIONS

Marusko, et al.; U.S. Appl. No. 12/790,209, filed May 28, 2010.
Shapiro, et al.; U.S. Appl. No. 12/696,566, filed Jan. 29, 2010.
Dziech, et al.; U.S. Appl. No. 12/895,007 filed Sep. 30, 2010.
GB Search Report and Written Opinion issued in connection with corresponding GB Application No. GB1113829.4 on Oct. 28, 2011.

* cited by examiner

RESILIENT MOUNTING APPARATUS FOR LOW-DUCTILITY TURBINE SHROUD

BACKGROUND OF THE INVENTION

This invention relates generally to gas turbine engines, and more particularly to apparatus and methods for mounting shrouds made of a low-ductility material in the turbine sections of such engines.

A typical gas turbine engine includes a turbomachinery core having a high pressure compressor, a combustor, and a high pressure turbine in serial flow relationship. The core is operable in a known manner to generate a primary gas flow. The high pressure turbine (also referred to as a gas generator turbine) includes one or more rotors which extract energy from the primary gas flow. Each rotor comprises an annular array of blades or buckets carried by a rotating disk. The flowpath through the rotor is defined in part by a shroud, which is a stationary structure which circumscribes the tips of the blades or buckets. These components operate in an extremely high temperature environment, and must be cooled by air flow to ensure adequate service life. Typically, the air used for cooling is extracted (bled) from the compressor. Bleed air usage negatively impacts specific fuel consumption ("SFC") and should generally be minimized.

It has been proposed to replace metallic shroud structures with materials having better high-temperature capabilities, such as ceramic matrix composites (CMCs). These materials have unique mechanical properties that must be considered during design and application of an article such as a shroud segment. For example, CMC materials have relatively low tensile ductility or low strain to failure when compared with metallic materials. Also, CMCs have a coefficient of thermal expansion ("CTE") in the range of about 1.5-5 microinch/inch/degree F., significantly different from commercial metal alloys used as supports for metallic shrouds. Such metal alloys typically have a CTE in the range of about 7-10 microinch/inch/degree F.

CMC shrouds may be segmented to lower stresses from thermal growth and allow the engine's clearance control system to work effectively. One type of segmented CMC shroud incorporates a "box" design.

CMC shrouds must be positively positioned in order for the shroud to effectively perform. However, differential thermal expansion between CMC components and the surrounding metallic hardware can change operating clearances and cause overconstraint, overloads, and/or loss of desired preload.

Accordingly, there is a need for an apparatus for resiliently mounting CMC low-ductility turbine structures.

BRIEF SUMMARY OF THE INVENTION

This need is addressed by the present invention, which provides a resilient mounting apparatus for low-ductility turbine components, such as turbine shrouds. The axial position of the shroud may be determined at least in part by a spring element.

According to one aspect of the invention, a turbine flowpath apparatus for a gas turbine engine includes: a flowpath component exposed at least partially to a primary combustion gas flowpath of the engine, the flowpath component comprising low-ductility material; a metallic annular stationary structure surrounding the flowpath component; a first spring element disposed between the flowpath component and the stationary structure which resiliently urges the flowpath in a first axial direction; and a second spring element disposed between the flowpath component and the stationary structure which resiliently urges the flowpath component in a second axial direction in opposition to the first spring element.

According to another aspect of the invention, a turbine flowpath apparatus for a gas turbine engine includes: a flowpath component exposed at least partially to a primary combustion gas flowpath of the engine, the flowpath component comprising low-ductility material; a metallic annular stationary structure surrounding the flowpath component, including a bearing surface which bears against the flowpath component, so as to restrain the flowpath component from axial movement in a first direction; and a spring element disposed between the flowpath component and the stationary structure which resilient urges the flowpath component in the first direction against the bearing surface.

According to another aspect of the invention, turbine shroud apparatus for a gas turbine engine includes: a plurality of arcuate shroud segments arranged to form an annular shroud, each of the shroud segments comprising low-ductility material and having a cross-sectional shape defined by opposed forward and aft walls, and opposed inner and outer walls, the walls extending between opposed first and second end faces; an annular turbine case surrounding the shroud segments, the turbine case including a bearing surface which bears against the shroud segments, so as to restrain the shroud segments from axial movement in a first direction; and a spring element which resiliently urges the shroud segments in the first direction against the bearing surface.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
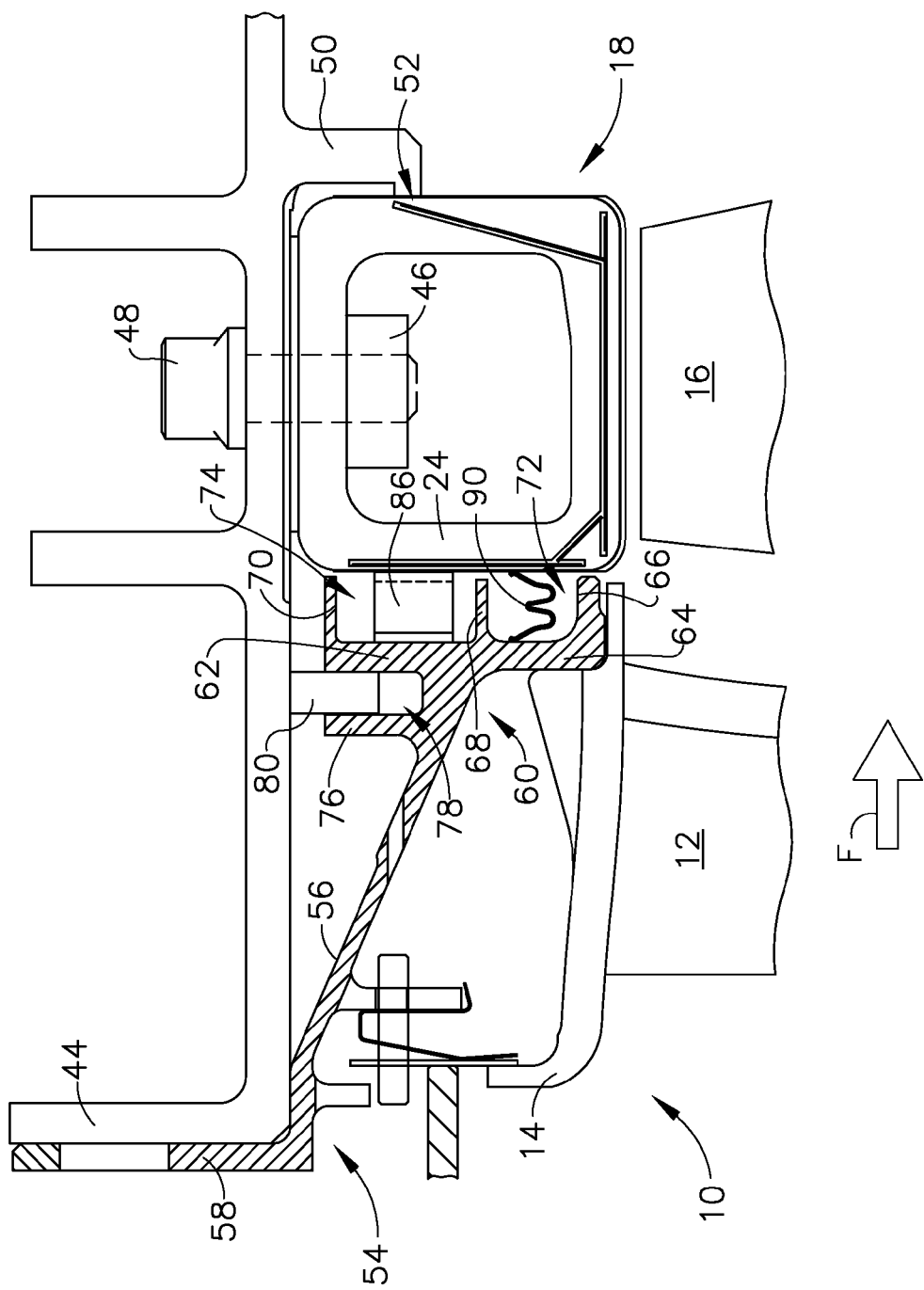
FIG. 1 is a schematic cross-sectional view of a portion of a turbine section of a gas turbine engine, incorporating a shroud mounting apparatus constructed in accordance with an aspect of the present invention.

Referring to the drawings wherein identical reference numerals denote the same elements throughout the various views, FIG. 1 depicts a small portion of a high pressure turbine ("HPT"), which is part of a gas turbine engine of a known type. The function of the high pressure turbine is to extract energy from high-temperature, pressurized combustion gases from an upstream combustor (not shown) and to convert the energy to mechanical work, in a known manner. The high pressure turbine drives an upstream compressor (not shown) through a shaft so as to supply pressurized air to the combustor.

In the illustrated example, the engine is a turbofan engine and a low pressure turbine would be located downstream of the gas generator turbine and coupled to a shaft driving a fan. However, the principles described herein are equally applicable to turbojet and turboshaft engines, as well as turbine engines used for other vehicles or in stationary applications. Furthermore, while a turbine nozzle is used as an example, the principles of the present invention are applicable to any low-ductility flowpath component which is at least partially exposed to a primary combustion gas flowpath of a gas turbine engine.

The HPT includes a stationary nozzle 10. It may be of unitary or built-up construction and includes a plurality of airfoil-shaped stationary turbine vanes 12 circumscribed by an annular outer band 14. The outer band 14 defines the outer radial boundary of the gas flow through the turbine nozzle 10. It may be a continuous annular element or it may be segmented.

Downstream of the nozzle 10, there is a rotor disk (not shown) that rotates about a centerline axis of the engine and carries an array of airfoil-shaped turbine blades 16. A shroud comprising a plurality of arcuate shroud segments 18 is arranged so as to encircle and closely surround the turbine blades 16 and thereby define the outer radial flowpath boundary for the hot gas stream flowing through the turbine blades 16.

Figure 2:
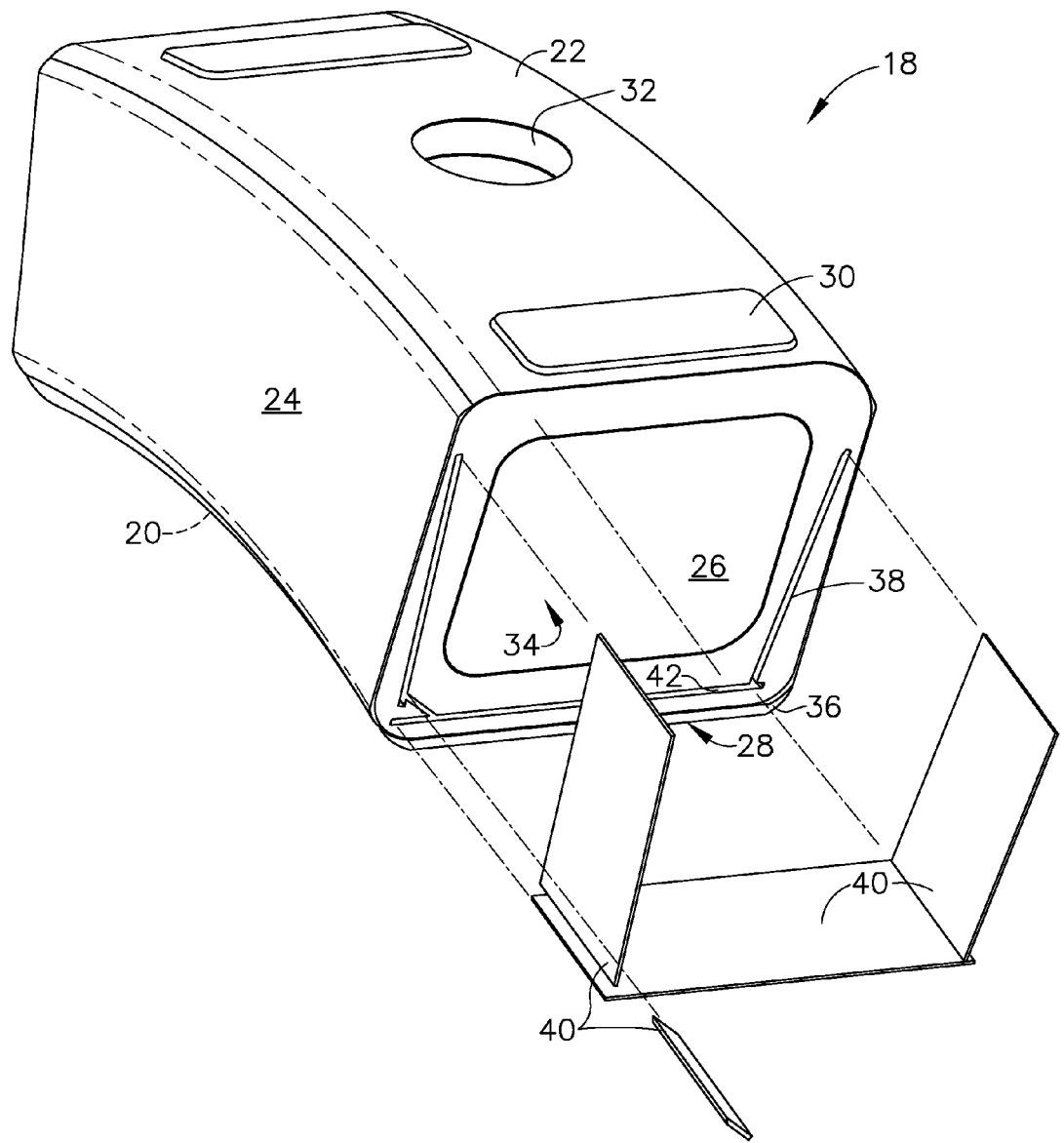
FIG. 2 is an exploded perspective view of a turbine shroud constructed in accordance with an aspect of the present invention, shown with several spline seals.

As seen in FIG. 2, each shroud segment 18 has a generally rectangular or "box"-shaped hollow cross-sectional shape defined by opposed inner and outer walls 20 and 22, and forward and aft walls 24 and 26. In the illustrated example radiused transitions are provided between the walls, but sharp or square-edged transitions may be used as well. The shroud segment 18 has a radially inner flowpath surface 28. One or more pads 30 protrude from the outer wall 22 and may be used for alignment purposes. A mounting hole 32 passes through the outer wall 22. A shroud cavity 34 is defined within the walls 20, 22, 24, and 26.

The shroud segments 18 are constructed from a ceramic matrix composite (CMC) material of a known type. Generally, commercially available CMC materials include a ceramic type fiber for example SiC, forms of which are coated with a compliant material such as Boron Nitride (BN). The fibers are carried in a ceramic type matrix, one form of which is Silicon Carbide (SiC). Typically, CMC type materials have a room temperature tensile ductility of no greater than about 1%, herein used to define and mean a low tensile ductility material. Generally CMC type materials have a room temperature tensile ductility in the range of about 0.4 to about 0.7%. This is compared with metals having a room temperature tensile ductility of at least about 5%, for example in the range of about 5 to about 15%. The shroud segments 18 could also be constructed from other low-ductility, high-temperature-capable materials.

The flowpath surface 28 of the shroud segment 18 may incorporate a layer of environmental barrier coating ("EBC"), an abradable material, and/or a rub-tolerant material 36 of a known type suitable for use with CMC materials. This layer is sometimes referred to as a "rub coat". In the illustrated example, the abradable material 36 is about 0.51 mm (0.020 in.) to about 0.76 mm (0.030 in.) thick.

The shroud segments 18 include opposed end faces 38 (also commonly referred to as "slash" faces). The end faces 38 may line in a plane parallel to the centerline axis of the engine, referred to as a "radial plane", or then may be oriented so to they are at an acute angle to such a radial plane. When assembled into a complete ring, end gaps are present between the end faces 38 of adjacent shroud segments 18. One or more seals 40 may be provided at the end faces 38. Similar seals are generally known as "spline seals" and take the form of thin strips of metal or other suitable material which are inserted in slots 42 in the end faces 38. The spline seals 40 span the gaps between shroud segments 18.

The shroud segments 18 are mounted to a stationary metallic engine structure, shown in FIG. 1. In this example the stationary structure is part of a turbine case 44. A hanger 46 or load spreader is disposed inside each of the mounting holes 32. A fastener 48 such as the illustrated bolt engages the hanger 46 passes through the mounting holes and positions the pads 30 of the shroud segment 18 relative to the inner face of the turbine case 44. The hanger 46 or a separate washer (not shown) may be used to prevent air leakage in or out of the shroud cavity 34 through the mounting holes 32 by providing a close fit between the hanger 46 (or washer) and the shank of the fastener 48, and between the hanger 46 (or washer) and the outer wall 22 of the shroud segment 18. The shroud segment 18 is clamped or positioned in the radial direction.

The turbine case 44 includes a flange 50 which projects radially inward and defines and axially-facing bearing surface 52. The flange 50 could be formed as a separate component which is mechanically tied into the case 44. The bearing surface 52 acts as a rigid stop to aft motion of the shroud segments 18.

A metallic nozzle support 54 is positioned axially forward of the shroud segment 18. It includes a body 56 which is generally conical. An annular forward flange 58 extends radially outboard from the forward end of the body 56. The nozzle support 54 is rigidly coupled to the turbine case 44, for example using mechanical fasteners (not shown) passing through the forward flange 58. An annular rear flange 60 is disposed at the aft end of the body 56 and has an outer leg 62 and an inner leg 64. In this configuration, first, second, and third annular seal teeth 66, 68, and 70, respectively, extend aft from the rear flange 60. Any number of seal teeth may be used. In cooperation with the rear flange 60 they define inner and outer annular seal pockets 72 and 74. An annular rail 76 extends radially outward from the body 56 just forward of the outer leg 62. Together the outer leg 62 and the rail 76 define an annular seal slot 78.

Figure 3:
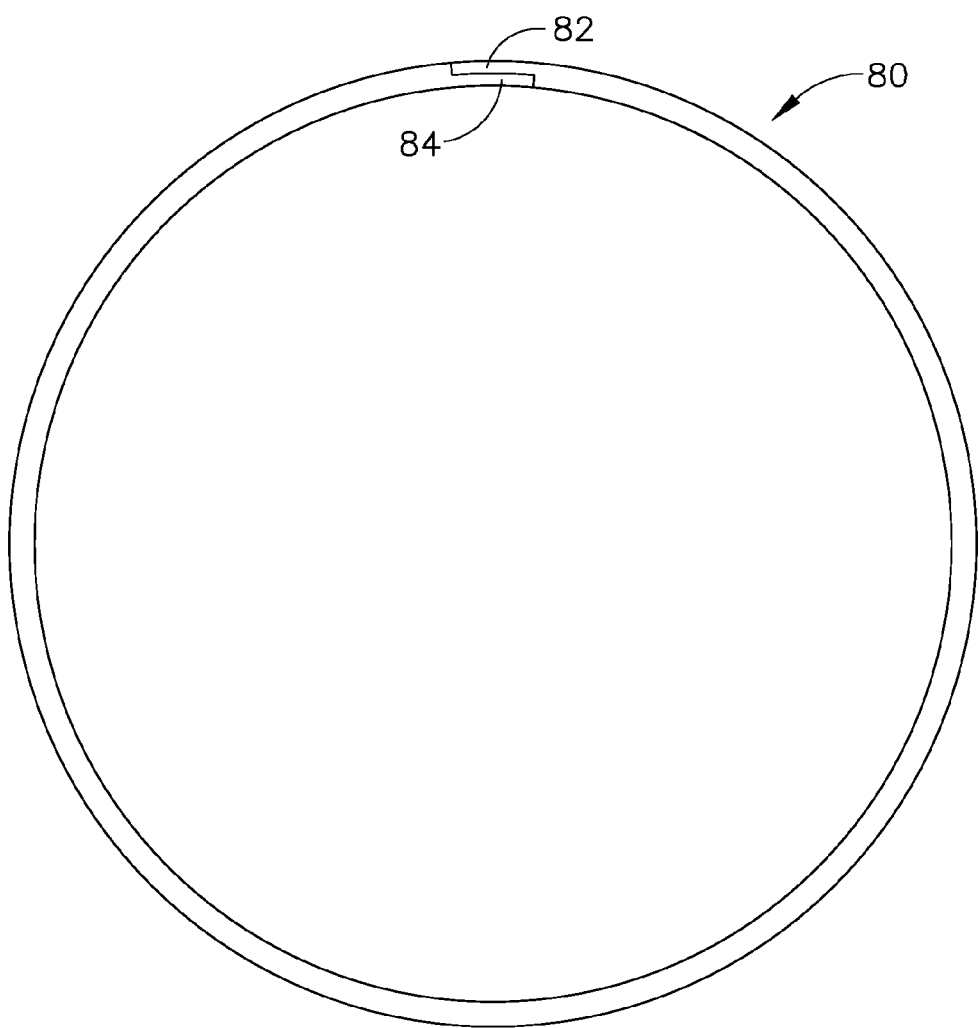
FIG. 3 is a front elevation view of a piston ring seal.

A seal in the form of a piston ring 80 is disposed in seal slot 78 and seals against the inner surface of the case 44. The piston ring 80 is illustrated in more detail in FIG. 3. The piston ring 80 is of a known type which provides a continuous (or nearly continuous) circumferential seal. It is split at one circumferential location, and is configured to provide a radially outward spring tension. The piston ring 80 may include known features which serve to reduce leakage between the ring ends, such as overlapping end tabs 82 and 84. Other known variations of the ring structure, such as different types of end arrangements, multi-part or "gapless" rings, or tandem rings (not shown) could also be used.

Figure 4:
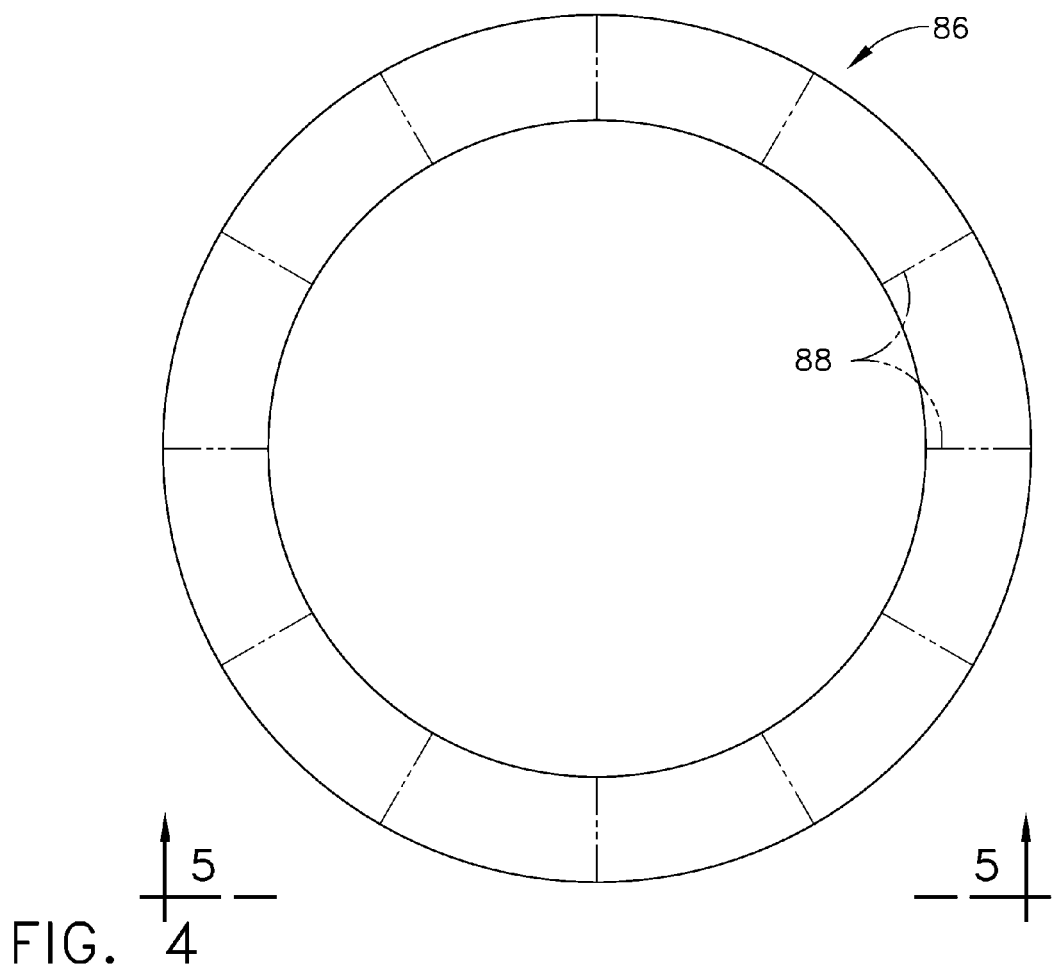
FIG. 4 is a front elevation view of an annular wave spring.
Figure 5:
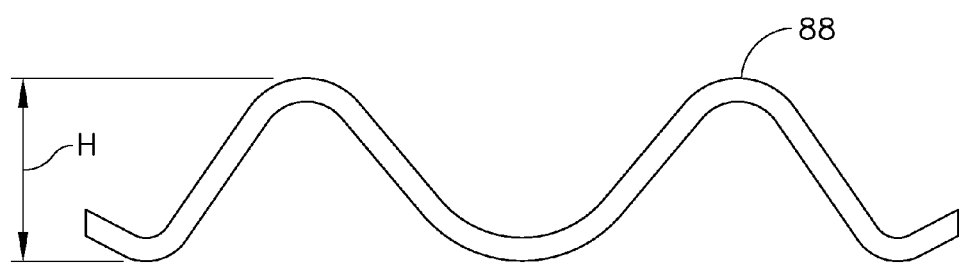
FIG. 5 is a view taken along lines 5-5 of FIG. 4.

A spring element 86 is disposed between the nozzle support 54 and the forward wall 24 of the shroud segment 18. As shown in FIGS. 4 and 5, the spring element 86 is an annular spring of the type referred to as a "wave spring" and comprises a series of alternating corrugations 88. In the illustrated example, it is positioned in the outer seal pocket 74, but may be positioned at any radial location along forward wall 24. The peak-to-valley height "H" of the corrugations 88, measured in the axial direction, is selected such that when the spring element 86 is installed it urges the shroud segment 18 in an aft direction with a desired preload. For example, the static preload at ambient temperature may be on the order of about 890 N (200 $lb_F$.). This function is described in more detail below. Various physical configurations of springs may be used for this function, such as the illustrated wave spring, or coil or leaf springs. Multiple spring elements can be used in series or parallel.

A sealing element 90 may be disposed between the nozzle support 54 and the shroud segment. In the illustrated example, it is an annular metallic seal that is resilient in the axial direction. Its cross-sectional shape includes a number of annular folds or convolutions and resembles the letter "W". This type of seal is thus commonly referred to as a "W-seal". In this example, the sealing element 90 is disposed in the inner seal pocket 72 between the inner leg 64 and the forward wall 24 of the shroud segments 18. It may be positioned at any radial location along forward wall 24.

In operation, the spring element 86 loads the shroud segments 18 axially aft against the flange 50 of the turbine case 44. The bearing surface 52 provides a hard stop against axial motion. During engine operation, differential thermal expansion will occur between the shroud segment 18 and the surrounding metallic components. This will result in a change in the clearances between the various components. The spring element 86 will expand or contract as necessary to accommodate this motion while maintaining a suitable preload of the shroud segments 18 against the flange 50. The use of the spring element 86 to provide an axial preload obviates problems that would be expected if a completely rigid mounting were used, for example overloads or loss of preload due to differential thermal expansion of the shroud segment 18 and surrounding metallic hardware. Furthermore, unlike a purely bolted joint, the mounting apparatus described herein is not dependent on unpredictable friction loads between the shroud segment 18 and the turbine case 44 to maintain the axial position of the shroud segments 18.

Figure 6:
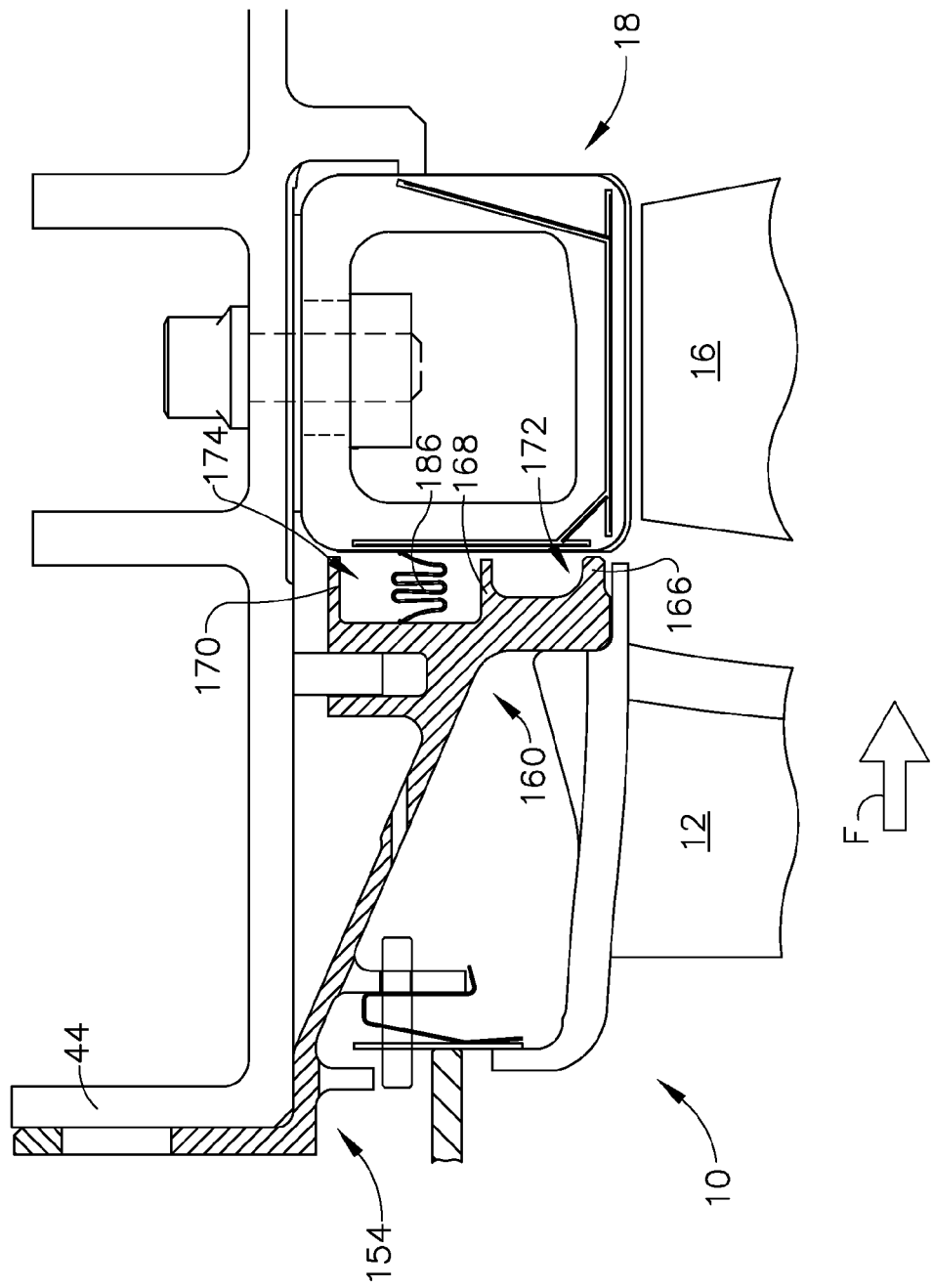
FIG. 6 is a schematic cross-sectional view of a portion of a turbine section of a gas turbine engine, incorporating an alternative shroud mounting apparatus constructed in accordance with an aspect of the present invention.

Various configurations of springs and sealing elements may be used between the nozzle support 54 and the shroud segment 18. For example, FIG. 6 shows an alternative configuration of a turbine case 44, a shroud segment 18, and a nozzle support 154. The nozzle support 154 is similar in construction to the nozzle support 54 described above and includes an annular rear flange 160 disposed at its aft end. First, second, and third annular seal teeth 166, 168, and 170, respectively, extend aft from the rear flange 160. Any number of seal teeth may be used. In cooperation with the rear flange 160 they define inner and outer annular seal pockets 172 and 174.

A spring element 186 is disposed between the nozzle support 154 and the forward wall 24 of the shroud segment 18. In this configuration, the spring element 186 is a W-seal of the type described above and is positioned in the outer seal pocket 174. It may be positioned at any radial location along forward wall 24. The W-seal's characteristics (alloy, material thickness, shape and number of folds, etc.) are selected such that when the spring element 186 is installed it urges the shroud segment 18 in an aft direction with a desired preload. It thus serves as both a spring element and as a sealing device.

Figure 7:
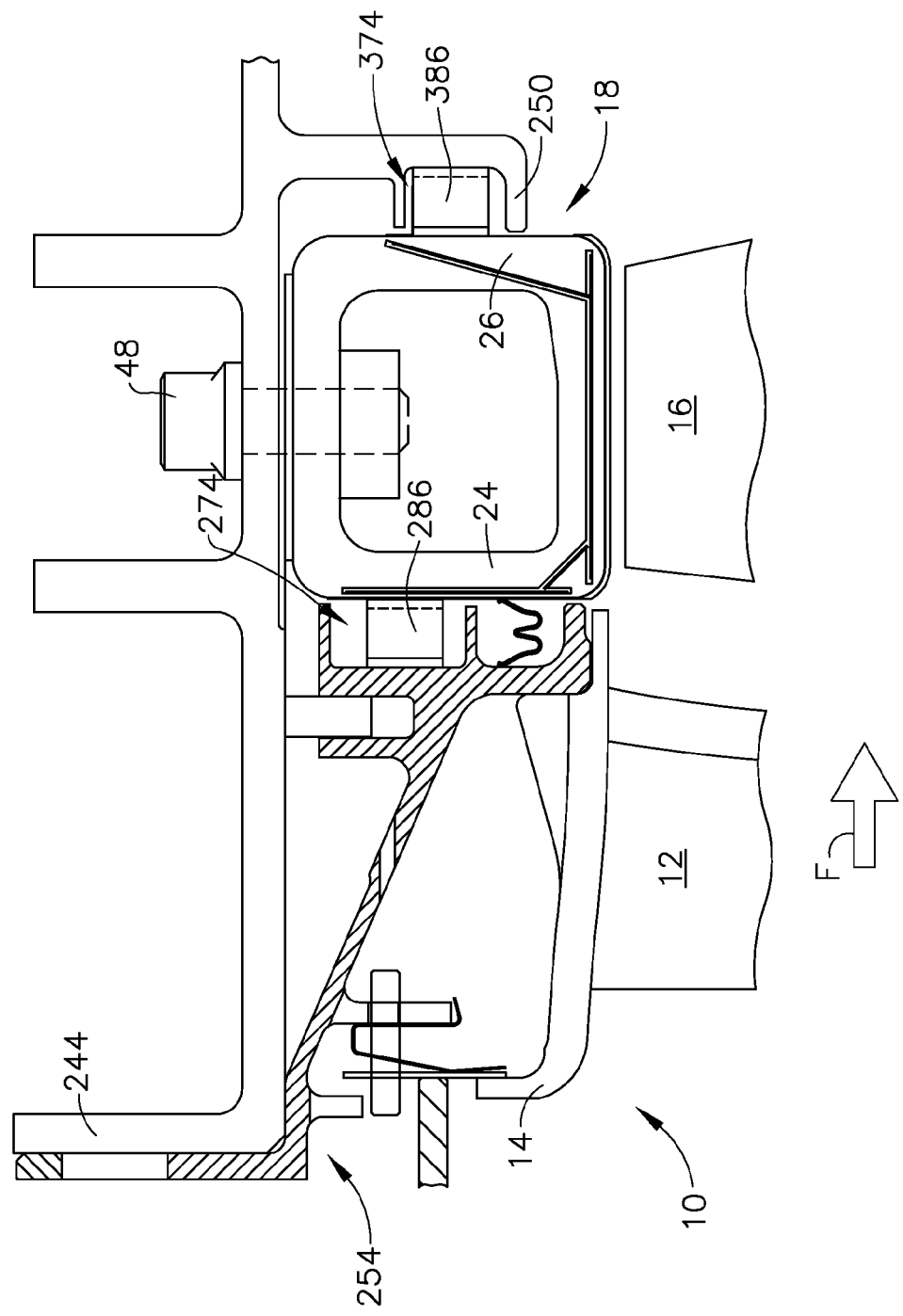
FIG. 7 is a schematic cross-sectional view of a portion of a turbine section of a gas turbine engine, incorporating another alternative shroud mounting apparatus constructed in accordance with an aspect of the present invention.

It is also possible to locate the shroud segments 18 using multiple spring elements. For example, FIG. 7 shows an alternative configuration of a turbine case 244, a shroud segment 18, and a nozzle support 254. The nozzle support 254 is similar in construction to the nozzle support 54 described above.

A first spring element 286, in this case an annular wave spring, is disposed in a forward seal pocket 274, between the nozzle support 254 and the forward wall 24 of the shroud segment 18. The wave spring's characteristics (alloy, material thickness, shape and number of corrugations, etc.) are selected such that when the first spring element 286 is installed it urges the shroud segment 18 in an aft direction with a desired preload.

The turbine case 244 includes a flange 250 which defines an aft seal pocket 374. A second spring element 386, in this case an annular wave spring, is disposed in pocket 374 between the flange 250 and the aft wall 26 of the shroud segment 18. The second spring element 386 could also be a W-seal as described above. Its characteristics (alloy, material thickness, shape and number of corrugations, etc.) are selected such that when the second spring element 386 is installed it urges the shroud segments 18 in a forward direction with a desired preload. The axial position of the shroud segments 18 is determined by the point at which the loads from spring elements 286 and 386 are in equilibrium.

The shroud mounting apparatus described above is effective to axially locate a low-ductility shroud in a turbine engine and to ensure proper sealing. It allows for the difference in the coefficient of thermal expansion between CMC material and metals while still providing secure positioning.

The foregoing has described a turbine shroud mounting apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine shroud apparatus for a gas turbine engine, comprising:
   a plurality of arcuate shroud segments arranged to form an annular shroud, each of the shroud segments comprising low-ductility material and having a cross-sectional shape defined by opposed forward and aft walls, and opposed inner and outer walls, the walls extending between opposed first and second end faces;
   an annular turbine case surrounding the shroud segments, the turbine case including a bearing surface which bears against the shroud segments, so as to restrain the shroud segments from axial movement in a first direction;
   an annular nozzle support mounted to the turbine case and positioned on an axially opposite side of the shroud segments from the bearing surface, the nozzle support defining a radially-outward facing seal slot;
   a piston ring disposed in the seal slot and extending radially outward so as to contact an inner surface of the turbine case; and
   a spring element disposed between the nozzle support and the shroud segments which resiliently urges the shroud segments in the first direction against the bearing surface.

2. The apparatus of claim 1 wherein the spring element is an annular wave spring.

3. The apparatus of claim 1 wherein the spring element is an annular seal having a cross-sectional shape comprising a plurality of annular convolutions.

4. The apparatus of claim 1 further including an annular sealing element extending between the nozzle support and the shroud segments.

5. The apparatus of claim 1 wherein the nozzle support includes an annular rear flange disposed at an end of the body nearest the shroud segments, the rear flange including two or more annular, spaced-apart, axially-extending seal teeth which define one or more annular seal pockets adjacent the shroud segments.

6. The apparatus of claim 5 wherein the spring element is disposed within one of the seal pockets.

7. The apparatus of claim 1 wherein the shroud segment comprises a ceramic matrix composite material.

* * * * *